United States Patent [19]

Katsumata et al.

[11] Patent Number: 5,032,943
[45] Date of Patent: Jul. 16, 1991

[54] MAGNETORESISTIVE HEAD HAVING CONTROLLED REPRODUCTION OUTPUT CHARACTERISTICS

[75] Inventors: Masao Katsumata, Odawara; Kazuhiro Momata, Chigasaki; Kazuyoshi Adachi, Kanagawa; Kousaku Chida, Odawara, all of Japan

[73] Assignee: Hitachi, Ltd., Tokyo, Japan

[21] Appl. No.: 314,570

[22] Filed: Feb. 23, 1989

[30] Foreign Application Priority Data

Mar. 2, 1988 [JP] Japan .................. 63-47488

[51] Int. Cl.$^5$ .............................. G11B 5/30
[52] U.S. Cl. .................................. 360/113
[58] Field of Search ............ 360/113; 338/32 R; 324/252

[56] References Cited

U.S. PATENT DOCUMENTS 3,975,772  8/1976  Lin ...................... 360/113
4,663,607  5/1987  Kitada et al. .......... 360/113
4,663,684  5/1987  Kano et al. ........... 360/113

FOREIGN PATENT DOCUMENTS 53-25646   7/1978  Japan .
60-205814 10/1985  Japan .
0092220    4/1987  Japan ................... 360/113

Primary Examiner—David J. Severin
Attorney, Agent, or Firm—Kenyon & Kenyon

[57] ABSTRACT

A magnetoresistive head including a magnetoresistive element in which the magnetoresistive head has a specifically determined gap length and/or the magnetoresistive element has a specifically determined magnetostriction constant to thereby define a reproduction output vs. operation current characteristic curve of the head. The above-mentioned gap length and/or magnetostriction constant is determined such that a saturation operation current for which a reproduction output of the head is maximum is higher than an operation current with which the head is operative.

8 Claims, 6 Drawing Sheets

F I G. 2
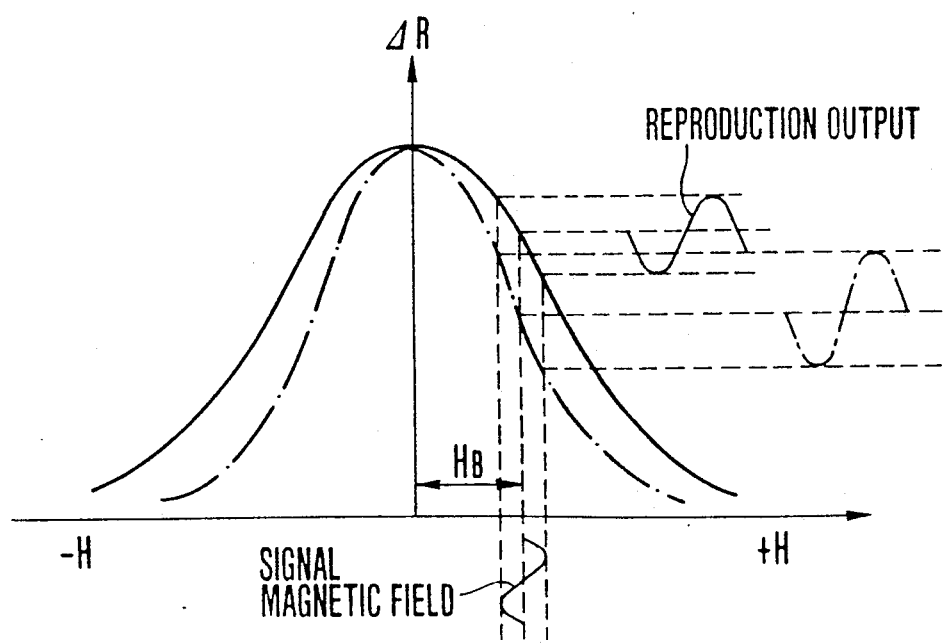

MAGNETORESISTIVE HEAD HAVING CONTROLLED REPRODUCTION OUTPUT CHARACTERISTICS

BACKGROUND OF THE INVENTION

This invention relates to a magnetoresistive head, and in particular to a magnetoresistive head which is used for reproduction of information recorded in magnetic recording medium such as magnetic tape, etc.

A known magnetoresistive head (hereinbelow abbreviated to MR head) has, as indicated in FIG. 1, a structure such that a first insulating layer 2 is formed on a first block 1 made of a magnetic material such as ferrite, etc.; then a bias conductor 3 and a magnetoresistive element (hereinbelow abbreviated to MR element) 4 are formed; similarly a second insulating layer 5 is formed on a second block 6 made of a magnetic substance such as ferrite, etc.; and these are joined, as disclosed e.g., in JP-B-53-25646 corresponding to JP-A-49-74523 laid-open on Jul. 18, 1974 and corresponding to U.S. Ser. No. 296742 filed on Oct. 11, 1972. In FIG. 1 they are indicated, for the sake of clarity, in a view exploded at the central portion. The two blocks 1 and 6 serve as a magnetic shield which protect the MR element and at the same time remove unnecessary signal magnetic field so to increase the resolving power. Further, on the MR element 4, there is closely disposed the bias conductor 3 which applies a suitable bias magnetic field thereto so that the variation thereof in the electrical resistance is optimum.

It is known that the variation in electrical resistance $\Delta R$ of the MR element when an external magnetic field H is applied to the MR head (hereinbelow called $\Delta R$-H characteristics) is as indicated by a curve in FIG. 2. Since, in response to the signal magnetic field of a recording magnetic medium such as magnetic tape, etc., the electrical resistance varies from the resistance resulting from the bias magnetic field $H_B$ applied by the bias conductor 3, depending on the intensity of the signal magnetic field. The variation of the resistance is taken out as a reproduction output (voltage) by making a predetermined operation current flow through the MR element 4. Consequently, the reproduced output varies, depending on the MR element 4 and the intensity of the current flowing through the bias conductor 3. As indicated in FIG. 3, the reproduction output generally increases proportionally to the operation current I flowing through the MR element 4. However, the reproduction output is saturated because of heat generation, etc. for current intensities higher than a certain value, and it decreases, even if the current is increased thereabove, as indicated by the characteristic curve in FIG. 3.

Furthermore, it can be understood that, when the $\Delta R$-H characteristics indicated by the solid line in FIG. 2 are changed to those indicated by the broken line, and since the variation $\Delta R$ in electric resistance with respect to the signal magnetic field varies, the curve representing the relation between the operation current and the reproduction output (hereinbelow called sense current characteristics) indicated in FIG. 3 also varies. The relation between the magnetostriction constant of the MR element 4 and the stress applied to the heat during the fabrication thereof may be cited as one of the factors causing the changes of the sense current characteristics. This is because the magnetic characteristics of the MR element 4 vary because stress is produced by strain generated by heating or cooling during the steps of film formation because of differences in the Young's modulus and the thermal expansion coefficient among the constituent materials thereof, or by strain generated by variations in the shape of the block taking place at the junction of the electromagnetic conversion gap, etc.

An invention disclosing control of the electromagnetic conversion characteristics by using the stress, taking into account the magnetostriction constant, of the MR element, is disclosed in JP-A-60-205814. The structure of the MR head is basically identical to that indicated in FIG. 1. According to the known techniques, stress is applied from the exterior to the MR head so that the electromagnetic conversion characteristics are optimum, depending on the magnetostriction constant of the MR element when the MR head is mounted on a fixing plate for holding the MR head.

SUMMARY OF THE INVENTION

The present invention provides an MR head, which is suitable for reproducing information recorded with a high density on a recording medium.

The present invention also provide an MR head capable of giving a reproduction output with an increased signal-to-noise (S/N) ratio.

The inventors of this invention have carried out experiments described below to study relations between the gap length of the MR head and the sense current characteristics (i.e. reproduction output voltage versus operation current characteristics) as well as relations between the magnetostriction constant of the MR element of the MR head and the sense current characteristics, as typically shown in FIGS. 6 and 7.

In order to perform high density information recording, it is necessary to decrease the electromagnetic converting gap length in the magnetic head for the purpose of increasing the reproduction output and for the resolving power and improving frequency characteristics. For the MR head reproducing information recorded at such a high density, it is necessary to make the first insulating layer 2 and the second insulating layer 5 thin. However, when the thickness of the first insulating layer 2 and the second insulating layer 5 vary, the magnetoresistance between the MR element 4 and the bias conductor 3 varies and thus the bias magnetic field $H_B$ applied to the MR element 4 varies. For this reason, the operation point of the signal magnetic field in the $\Delta R$-H curve, indicated in FIG. 2, varies and the sense current characteristic curve, indicated in FIG. 3, varies as well. In this way, it can be said that there is a close relationship between the electromagnetic converting gap length and the sense current characteristics.

FIG. 6 shows the sense current characteristics, the parameter being the electromagnetic converting gap length G with a magnetostriction constant $\lambda = 0$ for the MR element (made of an alloy Ni 82% -Fe 18%). The layer thickness of the MR element was 40 nm; the bias conductor was constituted by a Ti layer 135 nm thick, and the first insulating layer was 0.6 $\mu$m thick. The thickness of the second insulating layer was varied to vary the gap length G. The second insulator was 0.4 $\mu$m, 0.2 $\mu$m and 0.1 $\mu$m thick for G = 1.2 $\mu$m, 0.2 $\mu$m and 0.1 $\mu$m respectively. The information recording density was 25 KFRPI (Flux Reversal Per Inch). Since the magnetic resistance or reluctance between the bias conductor and the block made of ferrite material decreases with a decrease in the electromagnetic converting gap length, the bias magnetic field can be more easily applied to the MR element. For this reason, it became clear that the current at the point where the reproduction output is maximum and saturated, decreases with a decrease in the electromagnetic converting gap length.

FIG. 7 shows the sense current characteristics of an MR element with compressive stress applied thereto along the longitudinal direction (easy magnetization direction) thereof, the parameter being the magnetostriction constant of the MR element with a gap length $G=1.0$ μm. The measurement conditions other than those indicated in the figure are identical to the corresponding conditions described with reference to FIG. 6. When an MR element whose magnetostriction constant $\lambda$ is positive is subjected to a compressive stress in its lengthwise direction (in the direction of the track width), the anisotropic magnetic field represented by shape anisotropy and inductive magnetic anisotropy is weakened and therefore the MR element exhibits a large variation in the electrical resistance $\Delta R$ in response to a signal magnetic field, even with the application of a small bias magnetic field. Namely, this means, as seen for example in FIG. 2, that the $\Delta R$-H curve of the MR head without compressive stress applied to the MR element, which is indicated by the solid line, is changed to the curve indicated by the chain line after compressive stress has been applied to the MR element of the head, with the result being that the reproduction output with an operation current is increased accordingly. This means that the bias magnetic field can be more easily applied to the MR element. Consequently, the reproduction output is saturated by a smaller operation current. Therefore, since the anisotropy magnetic field becomes stronger with a decrease of the magnetostriction constant $\lambda$, i.e. as it approaches zero, the variation in the reproduction output with respect to the operation current becomes smaller and the saturation point or maximum output point of the reproduction output is shifted so as to occur at a higher operation current. In the case where the magnetostriction constant $\lambda$ is negative, in contrast to the above description, since the anisotropy magnetic field is strengthened with an increase of the absolute value of the magnetostriction constant $\lambda$, the variation in the reproduction output with respect to the operation current decreases further and the reproduction output is saturated or becomes maximum with a higher operation current.

Furthermore, when tensile stress is applied to the MR element, it is easily presumed from the physical characteristics that the variations of the sense current characteristics for variations of the magnetostriction constant $\lambda$ from positive to negative are opposite to those described above.

Further, the magnetostriction constant $\lambda$ of the MR element is determined by specifying the material of which the MR element is composed. For example, in the case where the MR element is made of an Ni-Fe alloy, it is known that the magnetostriction constant is varied by varying the Ni content. As indicated in FIG. 8, it is known that in general, when the Ni content increases, the magnetostriction constant decreases monotonically and that $\lambda$ changes from positive to negative for an Ni content between 78% and 84%.

On the basis of these facts, it was found that it is possible to improve the characteristics of the MR head by making the sense current characteristics optimum, while varying the magnitude of the electromagnetic converting gap length and/or the magnetostriction constant $\lambda$ of the MR element.

According to one aspect of this invention, in an MR head including an MR element, the gap length of the head and/or the magnetostriction constant of the MR element are determined such that the saturation operation current, which makes the reproduction output maximum, is higher than the operation current determined for the reproduction of recorded information.

According to another aspect of this invention, the MR head includes at least an MR element, shielding materials provided on both sides of the MR element with non-magnetic insulating layers formed therebetween, and an electromagnetic converting gap defined by the shielding material, the determination of the magnetostriction constant of the MR element being determined, depending on the electromagnetic converting gap length.

The MR head may have not only one MR element but also two or more MR elements. Heretofore, there are known a type of MR heads, in which there are disposed two MR elements, to which bias magnetic fields in opposite directions to each other are applied. This invention also can be applied to this type of MR heads. Further, the shielding material is not always in the form of blocks, but it may be a film-shaped shielding material.

BRIEF DESCRIPTION OF THE DRAWINGS

FIGS. 2 and 3 show characteristics curves of an MR head for explaining the operation of the MR head.

DETAILED DESCRIPTION

Figure 1:
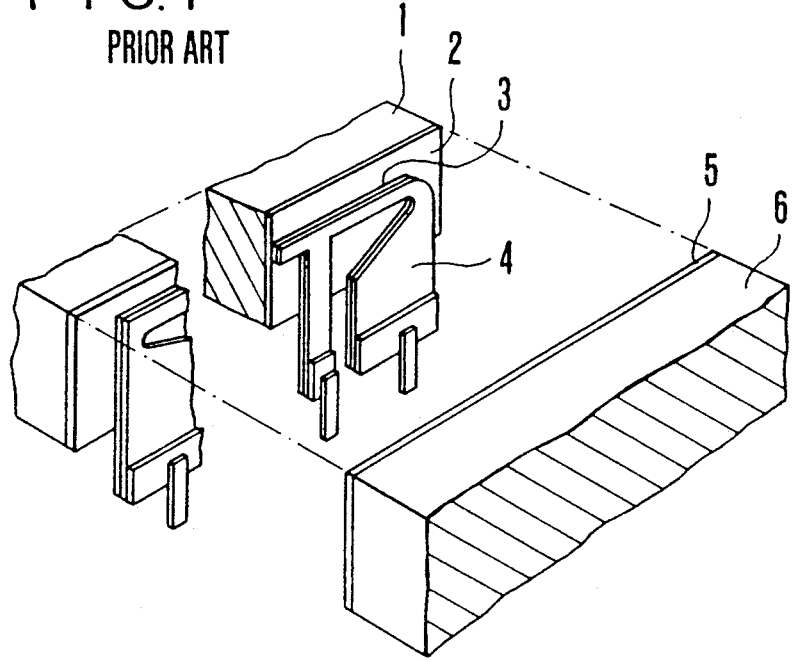
FIG. 1 is a perspective view of an MR head for explaining prior art techniques.
Figure 3:
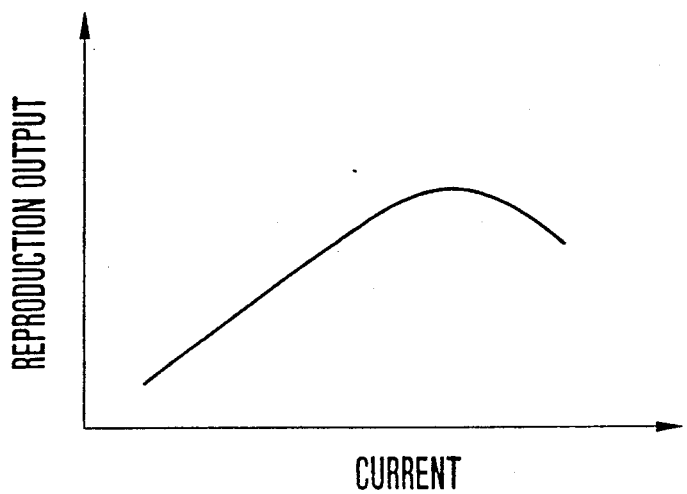
Figure 4:
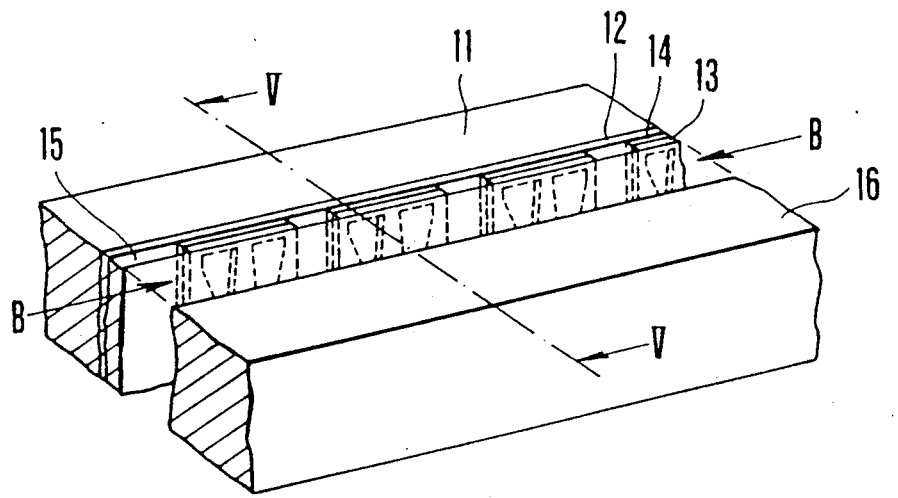
FIG. 4 is a perspective view of an MR head for explaining an embodiment of this invention.
Figure 5:
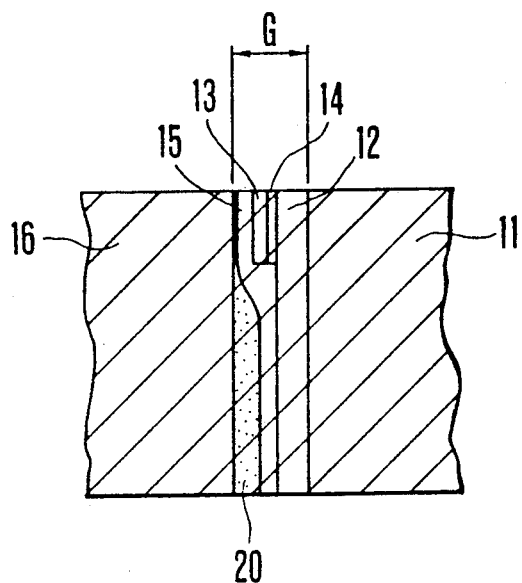
FIG. 5 is a cross-sectional view taken along line V—V in FIG. 4.

FIG. 4 is a perspective view of an MR head for explaining an embodiment of this invention, which is exploded at the central portion for the sake of clarity, and FIG. 5 is a cross-sectional view along the line V—V in FIG. 4. After having formed a first insulating layer 12 made of such material as $Al_2O_3$ or $SiO_2$, on a first block 11 made of a magnetic material such as a Ni-Zn ferrite by sputtering, for example, an MR element 14 made of e.g. Permalloy (Ni-Fe alloy) material and a bias conductor 13 made of a metallic material, which is an electrical conductor such as Ti or Mo are deposited thereon by sputtering or evaporation, for example, and etched into a desired form by ion milling, for example. Further, a second insulating layer 15 made of such material as $Al_2O_3$ or $SiO_2$ is formed. After these fabrication steps have been performed, the resulting assembly is cut and ground to a desired block. An MR head is completed by joining a second block 16 made of a magnetic material such as Ni-Zn ferrite with that initial block by means of adhesive resin (as indicated by numeral 20) so as to form an electromagnetic converting gap therebetween. The MR head shown in FIG. 4 is a so-called shunt bias type MR head, in which the part for performing electromagnetic conversion includes the MR element 14 and the bias conductor 13 formed so as to be electrically conductive to each other so that a bias magnetic field is applied to the MR element 14 by the current supplied to that part, and variations in electrical resistance of the MR element 14 are taken out as variations in the voltage.

In an MR head having such a structure, the layer thickness of the MR element 14 is usually 20 to 60 nm for the purpose of utilizing the MR effect at maximum and obtaining stable magnetic characteristics. Here, an MR element 40 nm is used. When current flows through the MR element 14 and the bias conductor 13, it is divided depending on the ratio of their resistances. For the MR element 14, the partial current flowing therethrough is so controlled that the current density is between $1 \times 10^6$ and $2 \times 10^6$ A/cm$^2$ in order to obtain a necessary reproduction output (e.g. 1 mV). On the other hand, for the bias conductor 13, the strength of the bias magnetic field is approximately proportional to the intensity of the current flowing therethrough. In order to create as high as a possible current therethrough and to obtain a reproduced waveform without distortion, the ratio of the resistances of the MR element 14 to the bias conductor 13 is generally 1-0.6. In order to produce this resistance ratio with the MR element having a layer thickness of 40 nm, the thickness of the bias conductor 13 will have to be 135 nm, since the resistivity of the bias conductor 13 is generally 3 to 4 times as high as the resistivity of the MR element 14. Hereinbelow variations in the sense current characteristics obtained by using this MR head and by varying the electromagnetic converting gap length G and the magnetostriction constant λ of the MR element 14 will be explained, based on experimental results.

Figure 10:
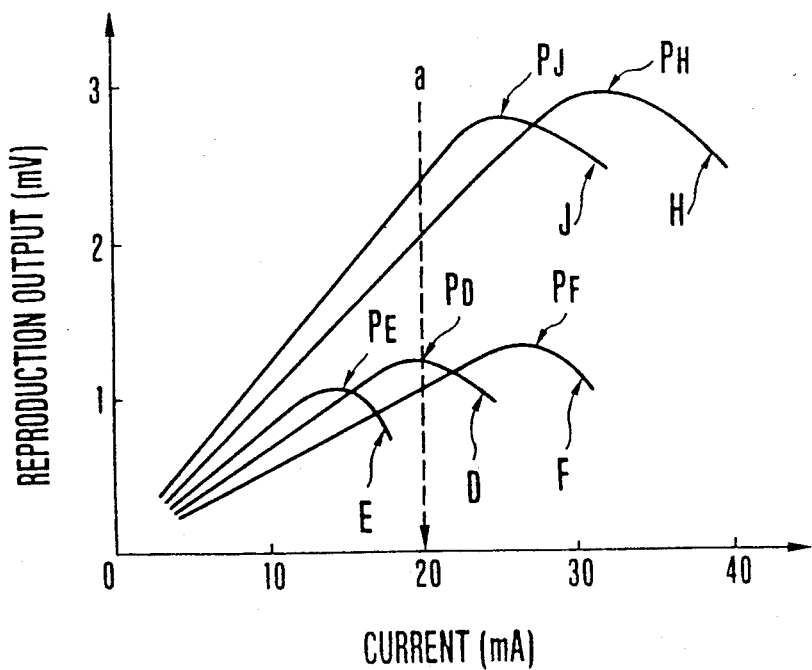
FIGS. 10 and 11 indicate characteristic curves of an MR head for explaining an embodiment of this invention.

In FIG. 10, curves D, E and F, indicated by solid lines, show the sense current characteristics when the electromagnetic converting gap length G is 0.7 μm (the first insulating layer 12 is 0.3 μm thick and the second insulating layer 15 is 0.2 μm thick) and the information recording density is 50 K FRPI (Flux Reversal Per Inch). The curve D in the figure shows the sense current characteristics using a Permalloy material having a 82% Ni composition, and for which the magnetostriction constant λ of the MR element 14 is almost zero. It was found by the inventors of this invention that in this case, the saturation point $P_D$ (maximum output point) in the reproduction output approximately coincides with the operation current a and this gives rise to a problem in that there is too much Barkhausen noise and thermal noise.

Figure 6:
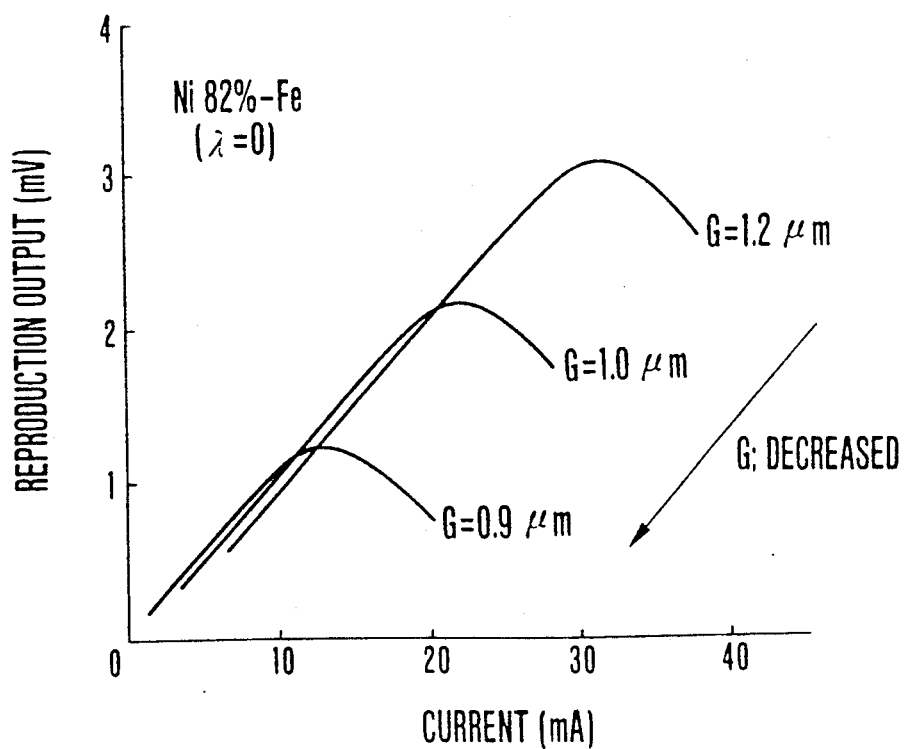
FIGS. 6 to 9 indicate curves which are useful for explaining principal characteristics of this invention.
Figure 9:
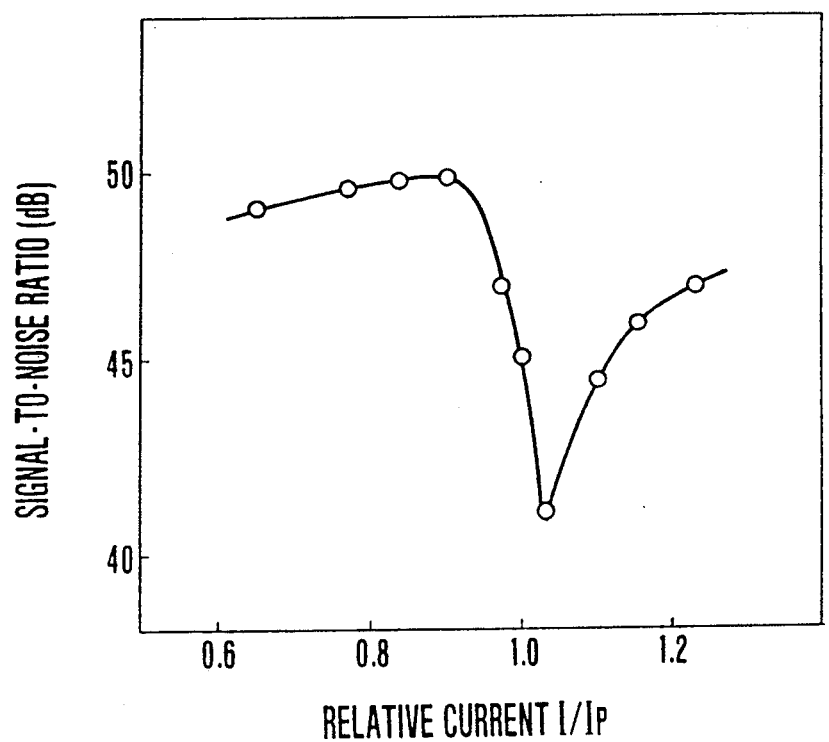

The relation between the operation current and the noise was studied by using an MR head having the gap length G=1.0 μm seen in FIG. 6, and by reproducing information recorded with an information recording density of 25 K FRPI. FIG. 9 indicates the relation between the S/N ratio of the reproduction output and the relative current intensity. The relative current intensity means the ratio of the operation current intensity I to the current $I_p$ giving the maximum reproduction output (saturation output), i.e. $I/I_p$. It can be understood that for the example indicated in FIG. 9, it is desirable for the operation current intensity to be no higher than about 0.9 $I_p$. Therefore, experiments were carried out by varying the magnetostriction constant λ by varying the Ni component in the composition of the Permalloy material forming the MR element 14. The curve E indicates the sense current characteristics when the Permalloy material has a 81% Ni composition (λ=1×10$^{-6}$). It was found that the saturation point $P_E$ of the reproduction output is shifted towards lower current intensity and that the characteristics are remarkably worse at the point a of the operation current. It was verified that this is because in the fabrication process of the MR head indicated in FIG. 4, strain produced at the layer formation and strain produced at the electromagnetic converting gap formation occur in the longitudinal direction of the MR element 14, i.e. stress (compressive stress) occurs in the direction indicated by B in FIG. 4 and in this state the magnetostriction constant is increased. Therefore, on the basis of the knowledge described, and referring to FIG. 7, since the magnetostriction constant may be reduced when moving the saturation point P of the reproduction output towards higher current intensity when compressive stress is applied to the MR element, experiments were carried out by using a Permalloy material having a 83% Ni composition. The curve F shows the results obtained. By the sense current characteristics indicated by the curve F, the saturation point $P_F$ of the reproduction output is about 27 to 28 mA, which is higher than the point a of the operation current. Thus, the problem of the noise that was described previously increasing has been solved.

Next, experiments were carried out for a recording density of 25K FRPI. The electromagnetic converting gap length G was 1.2 μm (the first insulating layer 12 was 0.6 μm thick and the second insulating layer 15 was 0.4 μm thick). The curves H and J indicated in FIG. 10 show the results obtained. The curve H shows the sense current characteristics when using a Permalloy material having a 82% Ni composition, for which the magnetostriction constant λ is almost zero. In order to increase the electromagnetic converting gap length G, because the recording density decreases and the recording frequency becomes lower, as indicated in FIG. 6, it was not possible to obtain any reproduction output having a desired amplitude at the point a of the operation current due to the fact that the current intensity (about 32 mA) at the saturation point $P_H$ of the reproduction output is about 1.6 times as great as the current intensity at the point a. Therefore, on the basis of the knowledge described previously, and referring to FIG. 7, experiments were carried out by using a Permalloy material having a 81% Ni composition, for which the magnetostriction constant λ of the MR element 14 is about $1 \times 10^{-6}$, because it was thought that the saturation point $P_H$ could be brought closer to the point a of the operation current by increasing the magnetostriction constant λ so that the reproduction output is increased. The curve J shows the result obtained. According to the sense current characteristics indicated by the curve J, the current intensity at the saturation point $P_J$ is about 25 mA. Therefore, a high reproduction output with low noise was obtained at the point a of the operation current. It is understood that it is possible to optimize the operation current driving the MR head at the optimum position, which is lower than the current intensity at the saturation point (maximum output point) in the sense current characteristics and at which a high reproduction output is obtained, by varying the electromagnetic converting gap length G and/or the magnetostriction constant λ of the MR element.

Figure 11:
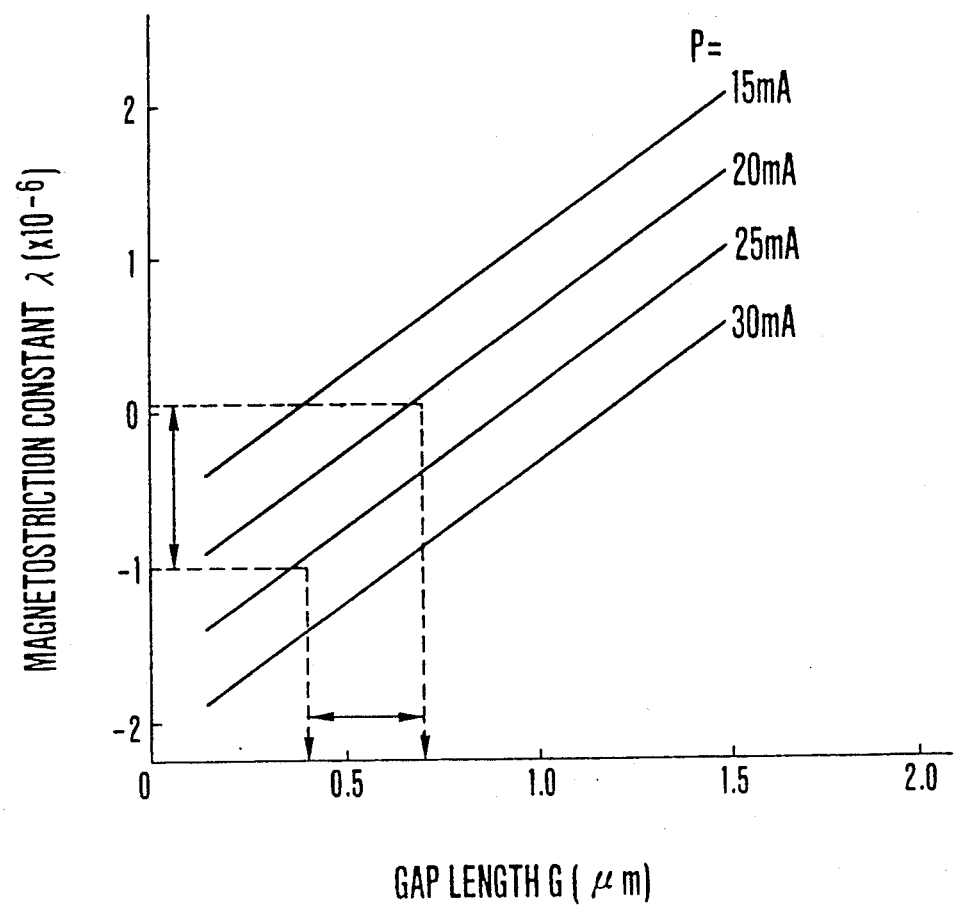

FIG. 11 shows the current intensity at the saturation point P of the reproduction output by using the relation between the electromagnetic converting gap length G and the magnetostriction constant λ on the basis of results obtained by measuring the sense current characteristics of the MR head (reproduction of information recorded with a recording density of 50K FRPI), while combining various electromagnetic converting gap lengths G and magnetostriction constants λ of the MR element 14 by the method described in reference to FIG. 10. Here, the bias conductor is formed by a Ti layer 135 nm thick and the MR element is formed by an Ni-Fe alloy layer 40 nm thick. Since the loss L in the reproduction output with respect to the electromagnetic converting gap length G can be expressed in general by Eq. (1), $$L = (\lambda'/\pi G) \sin(\pi G/\lambda') \tag{1}$$

if the recording wavelength ($\lambda'$) is reduced by a half, in order to suppress the loss in the reproduction output due to the electromagnetic converting gap G, it is necessary to reduce G by about a half. Consequently, since the recording wavelength is about 1 μm for a high recording density, which is about 50K FRPI, it is necessary to set the electromagnetic converting gap length in a range between 0.4 and 0.7 μm. Further, since the MR element 14 is generally used with a current density up to about $2 \times 10^6$ A/cm² because of the reliability such as migration life due to the current flowing therethrough, etc., it is desirable to use it in an operation current region between 15 and 20 mA. For that operation current range, the current at the saturation point is set for 20 to 26 mA. This is because the current at the saturation point should be greater than 1.1 times as great as the operation current, as can be seen from the description with reference to FIG. 9. Here, the current at the saturation point is set for 1.3 times the operation current since the saturation point P fluctuates, due to changes in the effective bias magnetic field resulting from fluctuations in the resistances of the MR element 14 and of the bias conductor 13 from head to head. Therefore, referring to FIG. 11, in the case where the electromagnetic converting gap length G is in a range between 0.4 and 0.7 μm, the magnetostriction constant λ of the MR element should be in a range between 0 and $-1 \times 10^{-6}$.

Figure 7:
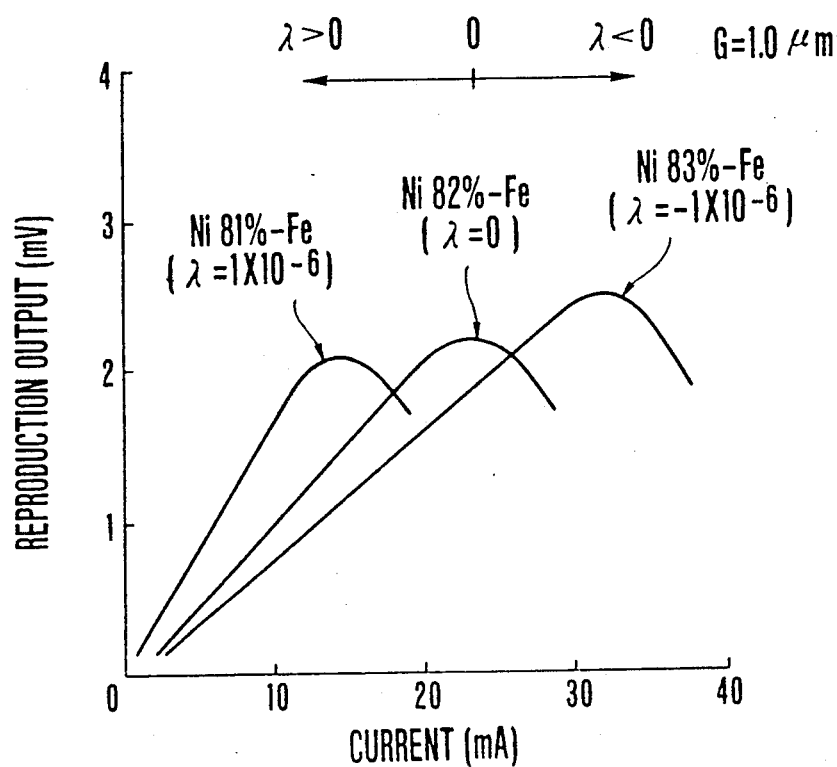
Figure 8:
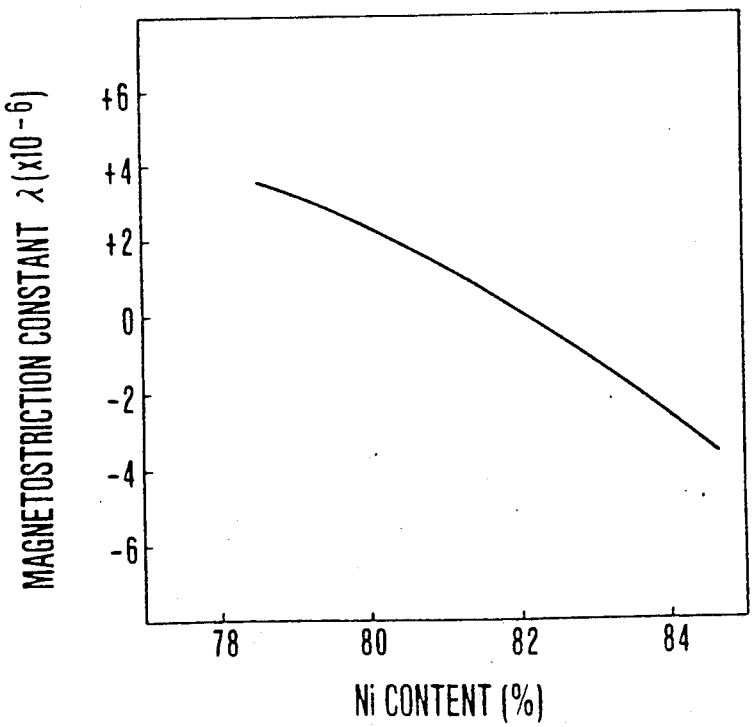

Furthermore, as understood from FIG. 7, it can be found that, in an MR head having a predetermined gap length, since the smaller the magnetostriction constant of the MR element is, the smaller are the variations in the reproduction output with respect to variations in the operation current, fabrication yield is improved.

Although reference has been made to Ni-Fe alloys as materials forming the MR element, other binary alloys such as Ni-Co alloys exhibiting the magnetoresistive effect may be employed to make the MR head. In that case, the magnetostriction constant of the MR element can be varied by changing the composition ratio of the elements of the binary alloy that is employed.

What is claimed is:

1. A magnetoresistive head comprises
a first magnetic block;
a second magnetic block;
a magnetoresistive element;
a bias conductor applying a bias to said magnetoresistive element wherein said first and second magnetic blocks sandwich said bias conductor and said magnetoresistive element;
wherein a gap length is a distance between said first and second magnetic blocks and wherein the head is operative with an operation current flowing in said magnetoresistive element, said magnetoresistive element having a magnetostriction constant determined in accordance with said gap length to make a saturation operation current, for which a signal reproduction output of said magnetoresistive head is a maximum, higher than said operation current.

2. A magnetoresistive head including a first magnetic block, a second magnetic block, a bias conductor, and a magnetoresistive element made of a material having a predetermined magnetostriction constant, said first and second magnetic blocks sandwiching said magnetoresistive element and said bias conductor, and the head being operative with an operation current flowing in said magnetoresistive element, said magnetoresistive head having a gap length defined by a distance between said first and second magnetic blocks and determined in accordance with said predetermined magnetostriction constant to make a saturation operation current, for which a signal reproduction output of said magnetoresistive head is maximum, higher than said operation current.

3. A magnetoresistive head comprises
a first magnetic block;
a second magnetic block;
a magnetoresistive element having a magnetostriction constant;
a bias conductor applying a bias to said magnetoresistive element wherein said first and second magnetic blocks sandwich said bias conductor and said magnetoresistive element;
wherein a gap length is a distance between said first and second magnetic blocks and wherein the head is operative with an operation current flowing in said magnetoresistive element, said gap length for said magnetoresistive head and said magnetostriction constant for said magnetoresistive element being determined with respect to one another such that a saturation operation current, for which a signal reproduction output of said magnetoresistive head is maximum, is made higher than said operation current.

4. A magnetoresistive head comprises
a first magnetic block;
a second magnetic block;
a magnetoresistive element;
a bias conductor applying a bias to said magnetoresistive element wherein said first and second magnetic blocks sandwich said bias conductor and said magnetoresistive element;
wherein a gap length is a distance between said first and second magnetic blocks and wherein the head is operative with an operation current flowing in said magnetoresistive element, said magnetoresistive element being made of a magnetoresistive material having a magnetostriction constant which defines a saturation operation current, for which a signal reproduction output of said magnetoresistive head is maximum, higher than said operation current for said gap length.

5. A magnetoresistive head according to claim 4, in which said magnetoresistive material is made of a Ni-Fe alloy. head is operative.

6. A magnetoresistive head according to claim 4, in which said magnetoresistive material is made of a Ni-Co alloy.

7. A magnetoresistive head including a first magnetic block, a second magnetic block, a bias conductor and a magnetoresistive element of a material having a predetermined magnetostriction constant, said first and second magnetic blocks sandwiching said magnetoresistive element and said bias conductor, the magnetoresistive head having a gap length defined by a distance between said first and second magnetic blocks and determined in accordance with said predetermined magnetostriction constant, to define a reproduction output vs. operation current characteristic curve of the head such that a saturation operation current for which a reproduction output of the head is maximum is higher than an operation current with which the head is operative.

8. A magnetoresistive head comprises
a first magnetic block;
a second magnetic block;
a magnetoresistive element;
a bias conductor applying a bias to said magnetoresistive element wherein said first and second magnetic blocks sandwich said bias conductor and said magnetoresistive element;
wherein a gap length is a distance between said first and second magnetic blocks, said magnetoresistive element having a magnetostriction constant determined in accordance with said gap length to define a reproduction output vs. operation current characteristic curve of the head such that a saturation operation current for which a reproduction output of the head is maximum is higher than an operation current with which the head is operative.

* * * * *

UNITED STATES PATENT AND TRADEMARK OFFICE
CERTIFICATE OF CORRECTION

PATENT NO.  : 5,032,943
DATED       : July 16, 1991
INVENTOR(S) : Masao Katsumata, et. al.

It is certified that error appears in the above-identified patent and that said Letters Patent is hereby corrected as shown below:

Column 1, line 27, after "so" insert --as--.

Column 2, line 22, change "provide" to --provides.

Column 2, line 38, after "and" insert --for--.

Column 4, line 32, change "characteristics" to --characteristic--.

Column 4, line 55, after "Mo" insert --,--.

Column 6, line 24, before "increasing" insert --as--.

Column 6, line 57, after "head" delete "at the optimum".

Column 6, line 58, delete "position".

Column 8, line 61, after "alloy." delete "head is operative."

Signed and Sealed this

Twenty-ninth Day of December, 1992

Attest:

DOUGLAS B. COMER

Attesting Officer

Acting Commissioner of Patents and Trademarks